United States Patent

Holland

[11] Patent Number: 4,891,931
[45] Date of Patent: Jan. 9, 1990

[54] WEED CUTTER WHEEL KIT

[76] Inventor: Paul W. Holland, Rte. 4, 18 Centark Cir., Alexander, Ark. 72002

[21] Appl. No.: 254,859

[22] Filed: Oct. 7, 1988

[51] Int. Cl.[4] ............................................. A01D 34/67
[52] U.S. Cl. ........................................ 56/16.7; 56/17.2
[58] Field of Search ...................... 56/16.7, 16.9, 17.1, 56/17.2, 17.4, 17.5, 400.14; 172/17; 280/43.11

[56] References Cited

U.S. PATENT DOCUMENTS

| 2,638,730 | 5/1953 | Davidson | 56/400.14 |
| 3,221,481 | 12/1965 | Mattson et al. | 56/16.9 |
| 3,788,049 | 1/1974 | Ehrlich | 56/16.9 |
| 3,977,078 | 8/1976 | Pittinger, Jr. | 56/16.9 X |
| 4,224,784 | 9/1980 | Hansen et al. | 56/16.9 |
| 4,358,123 | 11/1982 | Richards | 56/400.14 X |
| 4,796,415 | 1/1989 | Moore | 56/16.9 |
| 4,803,831 | 2/1989 | Carmine | 56/16.9 |
| 4,829,755 | 5/1989 | Nance | 56/17.1 |

Primary Examiner—Bruce M. Kisliuk
Assistant Examiner—Matthew Smith

[57] ABSTRACT

A wheel kit to be attached to a weed cutting device to be bolted to the tube directly behind the motor to support the weight of the cutting device while cutting or trimming grass or weeds.

3 Claims, 2 Drawing Sheets

WEED CUTTER WHEEL KIT

BACKGROUND

Since the invention of the grass cutting device commonly known as a weed eater; I have found no such device that supports the weight which must be held in front and away from the body in such a way that it creates extreme strain on the lower back. Having a lower back injury myself, I have been working on an invention which these current devices could be used without any back strain.

SUMMARY OF THE INVENTION

I have designed and built a wheel kit that can be attached to some of the devices.

DESCRIPTION OF THE INVENTION

Figure 1:
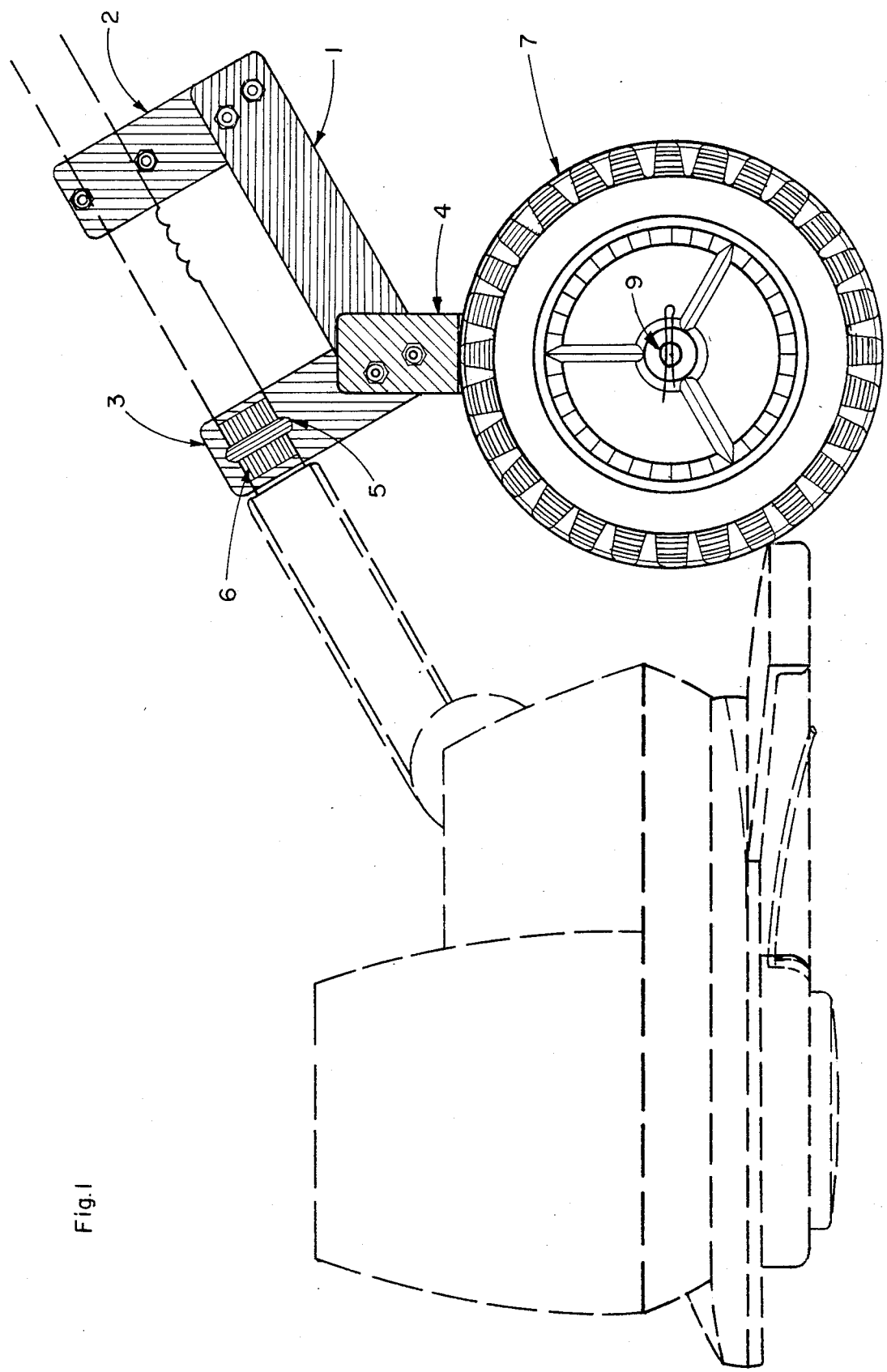
FIG. 1 is a side view of apparatus as attached to a line trimmer elevating said line trimmer to a height sufficient to carry out trimming.
Figure 2:
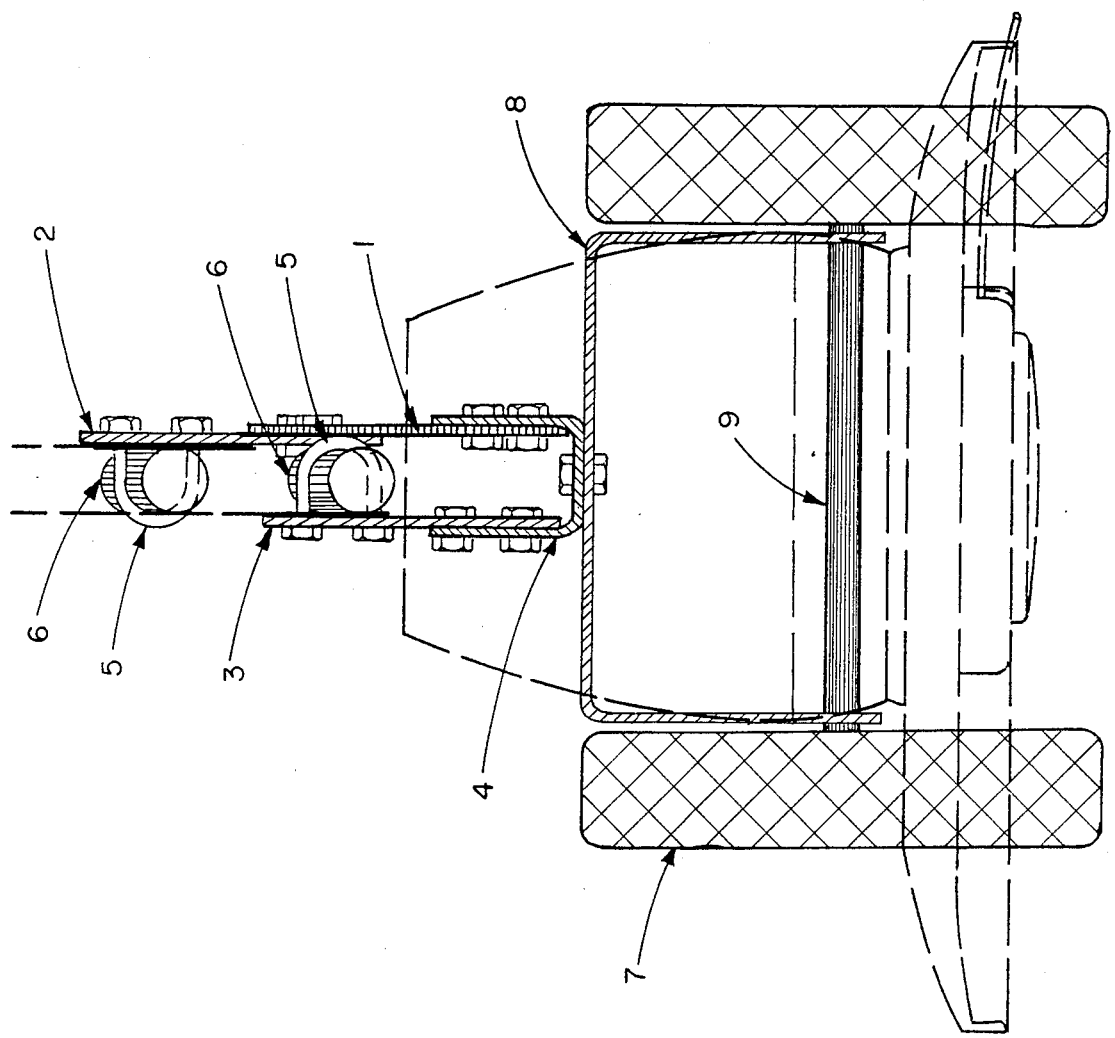
FIG. 2 is a front view of invention showing all components as attached to line trimmer shaft.

A weed cutter wheel kit to be attached to a weed cutting device consisting of 2 wheels 7, 1 axle 9, 2 brackets 4,8, 3 metal straps 1,2,3, 2 U-bolts 5, 2 spacers 6, 6 bolts, 6 nuts, 2 cotter pins, 2 axle pins, 2 axle washers.

I claim:

1. An apparatus for attachment to a line trimmer having a shaft portion and a head portion comprising:
   wheel means including an axle;
   a first U-shaped bracket having a base and legs with apertures, said first bracket inverted for insertion of said axle to elevate said bracket above a surface;
   a second U-shaped bracket having a base and legs attached to said first U-shaped bracket with the bases of each bracket in abutting relation;
   a first support member having ends, attached at one end to one leg of said second U-shaped bracket and at the other end of said line trimmer shaft portion by fastening means, said first support member angularly positioned on said second U-shaped bracket leg to orient said line trimmer head portion predetermined direction;
   a second support member having ends, attached at one end of said line trimmer shaft portion by fastening means and at the other end to one end of strut means in perpendicular relation;
   said strut means being angularly attached at an other end to the other leg of said second U-shaped bracket and said strut means, parallel to said line trimmer shaft portion;
   said wheel means, brackets, support members, and strut means elevating said line trimmer head portion to a height sufficient to carry out trimming.

2. The apparatus of claim 1 wherein said fastening means are U-bolts.

3. The apparatus of claim 1 wherein the brackets, support members, and strut means are metal.

* * * * *